United States Patent
Tome et al.

(10) Patent No.: US 12,311,742 B2
(45) Date of Patent: May 27, 2025

(54) DOOR WIRING MODULE AND DOOR PLANAR MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Yuta Tome, Osaka (JP); Housei Mizuno, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD, Osaka (JP)

( * ) Notice: Subject to any disclaimer, the term of this patent is extended or adjusted under 35 U.S.C. 154(b) by 0 days.

(21) Appl. No.: 18/565,643

(22) PCT Filed: May 31, 2022

(86) PCT No.: PCT/JP2022/022148
§ 371 (c)(1),
(2) Date: Nov. 30, 2023

(87) PCT Pub. No.: WO2022/270246
PCT Pub. Date: Dec. 29, 2022

(65) Prior Publication Data
US 2024/0198769 A1  Jun. 20, 2024

(30) Foreign Application Priority Data
Jun. 21, 2021  (JP) ................. 2021-102364

(51) Int. Cl.
*B60J 5/04* (2006.01)
*B60R 16/02* (2006.01)
*H02G 3/36* (2006.01)

(52) U.S. Cl.
CPC ......... *B60J 5/0418* (2013.01); *B60R 16/0215* (2013.01); *H02G 3/36* (2013.01)

(58) Field of Classification Search
CPC ..... B60R 16/0215; B60R 16/02; B60R 13/02; B60J 5/0418; H02G 3/36; H02G 3/381;
(Continued)

(56) References Cited

U.S. PATENT DOCUMENTS 4,848,829 A * 7/1989 Kidd ................... B60R 16/0207
174/72 A
4,907,836 A * 3/1990 Ueda ....................... B60R 13/02
296/146.7
(Continued)

FOREIGN PATENT DOCUMENTS

JP  2005-22427    1/2005
JP  2013-256176   12/2013
(Continued)

OTHER PUBLICATIONS

International Search Report issued in International Patent Application No. PCT/JP2022/022148, dated Aug. 2, 2022, along with an English translation thereof.
(Continued)

*Primary Examiner* — Justin B Rephann
(74) *Attorney, Agent, or Firm* — Greenblum & Bernstein, P.L.C.

(57) ABSTRACT

A door wiring module includes: a door planar member incorporated into a door to partition an inner side and an outer side of a vehicle; and a wiring member held by the door planar member, wherein the door planar member includes an inner side surface directed to the inner side of the vehicle and an outer side surface directed to the outer side of the vehicle, a wiring groove is formed in the inner side surface, at least a part of the wiring member is housed in the
(Continued)

housing groove, a guide protruding part guiding water is formed in the outer side surface, and at least a part of the guide protruding part is formed along at least a part of the wiring groove.

9 Claims, 6 Drawing Sheets

(58) Field of Classification Search
CPC .......... H02G 3/386; H02G 3/388; H02G 3/38; H02G 3/30
See application file for complete search history.

(56) References Cited

U.S. PATENT DOCUMENTS

| | | | | |
|---|---|---|---|---|
| 5,460,530 | A * | 10/1995 | Toba | B60R 16/0207 174/72 A |
| 6,000,959 | A * | 12/1999 | Curtindale | B60J 5/0418 439/246 |
| 6,126,228 | A * | 10/2000 | Davis, Jr. | B60R 16/0222 296/146.7 |
| 6,142,556 | A * | 11/2000 | Tanaka | B60R 16/0207 296/146.7 |
| 6,482,340 | B1 * | 11/2002 | Davis, Jr. | B60R 16/0207 264/46.4 |
| 6,494,522 | B1 * | 12/2002 | Drewniok | H05K 1/118 296/146.7 |
| 7,410,204 | B2 * | 8/2008 | Koa | B60J 5/0416 296/152 |
| 9,241,415 | B2 * | 1/2016 | Quinn | H01B 7/0045 |
| 10,017,133 | B2 * | 7/2018 | Tsunoda | H05K 1/0265 |
| 11,451,024 | B2 * | 9/2022 | Yamaguchi | H02G 3/0418 |
| 11,472,352 | B2 * | 10/2022 | Yamaguchi | H01B 7/08 |
| 12,049,177 | B2 * | 7/2024 | Yamaguchi | H03G 3/30 |
| 2003/0218279 | A1 * | 11/2003 | Kisu | B29C 51/16 264/510 |
| 2021/0009050 | A1 * | 1/2021 | Enomoto | H01B 13/01209 |
| 2021/0098976 | A1 | 4/2021 | Yamaguchi et al. | |
| 2022/0134973 | A1 | 5/2022 | Yamaguchi et al. | |

FOREIGN PATENT DOCUMENTS

| | | |
|---|---|---|
| JP | 2020-128137 | 8/2020 |
| WO | 2019/187334 | 10/2019 |

OTHER PUBLICATIONS

Japan Office Action issued in Japan Patent Application No. 2021-102364, dated Mar. 26, 2024, together with English translation thereof.

* cited by examiner

DOOR WIRING MODULE AND DOOR PLANAR MEMBER

TECHNICAL FIELD

The present disclosure relates to a door wiring module and a door planar member.

BACKGROUND ART

Patent Document 1 discloses a wiring member-integrated incorporated component in which a wiring member housing groove is formed in one main surface of a door component incorporated to cover an opening of a metal inner panel of a door to house at least a part of a wiring member in the wiring member housing groove.

PRIOR ART DOCUMENTS

Patent Document(s)

Patent Document 1: International Publication No. 2019/187334

SUMMARY

Problem to be Solved by the Invention

There is a possibility that rainwater, for example, enters a surface of the door component described above directed to an outer side of a vehicle. Thus, a convex part guiding water is considered to be formed in the surface of the door component directed to the outer side of the vehicle.

However, it is required that the door component is downsized when the wiring member housing groove is formed in the door component and the convex part for guiding the water is formed therein.

Accordingly, an object of the present disclosure is to downsize a door wiring module and a door planar member.

Means to Solve the Problem

A door wiring module according to the present disclosure is a door wiring module including: a door planar member incorporated into a door to partition an inner side and an outer side of a vehicle; and a wiring member held by the door planar member, wherein the door planar member includes an inner side surface directed to the inner side of the vehicle and an outer side surface directed to the outer side of the vehicle, a wiring groove is formed in the inner side surface, at least a part of the wiring member is housed in the housing groove, a guide protruding part guiding water is formed in the outer side surface, and at least a part of the guide protruding part is formed along at least a part of the wiring groove.

A door planar member according to the present disclosure is a door planar member incorporated into a door to partition an inner side and an outer side of a vehicle, including an inner side surface directed to the inner side of the vehicle and an outer side surface directed to the outer side of the vehicle, wherein a wiring groove housing at least a part of a wiring member is formed, a guide protruding part guiding water is formed in the outer side surface, and at least a part of the guide protruding part is formed along at least a part of the wiring groove.

Effects of the Invention

According to the present disclosure, an object is to downsize a door wiring module and a door planar member.

DESCRIPTION OF EMBODIMENT(S)

Description of Embodiment of Present Disclosure

Figure 1:
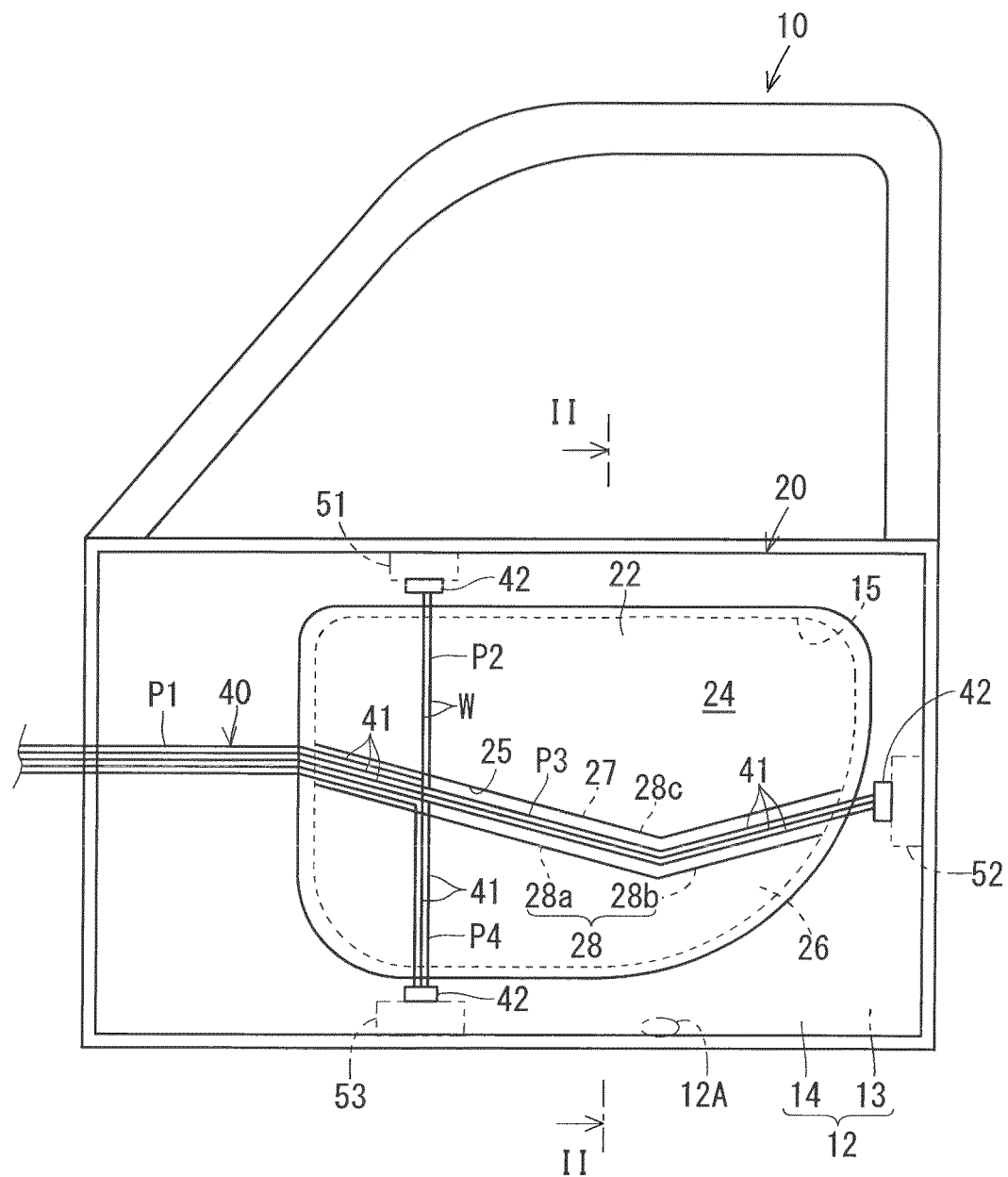
FIG. 1 is a schematic side view illustrating a door into which a door wiring module according to an embodiment is incorporated.

Embodiments of the present disclosure are listed and described firstly.

A door wiring module according to the present disclosure is as follows.

(1) A door wiring module includes: a door planar member incorporated into a door to partition an inner side and an outer side of a vehicle; and a wiring member held by the door planar member, wherein the door planar member includes an inner side surface directed to the inner side of the vehicle and an outer side surface directed to the outer side of the vehicle, a wiring groove is formed in the inner side surface, at least a part of the wiring member is housed in the housing groove, a guide protruding part guiding water is formed in the outer side surface, and at least a part of the guide protruding part is formed along at least a part of the wiring groove.

According to the door wiring module, the wiring groove is formed, thus a part of the door planar member having a shape of protruding to the outer side of the vehicle can be used as the guide protruding part protruding to the outer side of the vehicle. Accordingly, the door wiring module is downsized.

(2) The door wiring module according to (1), it is applicable that the wiring groove is a groove surrounded by a bottom part and a pair of lateral parts upstanding from both side parts of the bottom part, and at least a part of the pair of lateral parts and/or a part of the bottom part protrudes from the outer side surface to form at least the part of the guide protruding part. In this case, the bottom part for forming the wiring groove and the pair of lateral parts protrude from the outer side surface to form at least a part of the guide protruding part, thus the door wiring module is downsized.

(3) In the door wiring module according to (1) or (2), the guide protruding part may include an inclined part inclined relative to a front-back direction of the vehicle. In this case, water can be guided in the front-back direction of the vehicle by the guide protruding part.

(4) In the door wiring module according to (3), the inclined part may be inclined to guide water to one position in the front-back direction of the vehicle. In this manner, the water is guided to one position, thus the water can be easily discharged.

(5) In the door wiring module according to any one of (1) to (4), the guide protruding part may include a horizontal guide surface along a horizontal direction in a vehicle width direction. In this case, the horizontal guide surface can be easily formed.

(6) In the door wiring module according to any one of (1) to (5), the guide protruding part may include an upward inclination guide surface directed upward from the outer side surface toward the outer side of the vehicle. Accordingly, water can be guided to a front side or a back side of the vehicle more easily than the outer side of the vehicle. Accordingly, the water can be easily guided toward a discharge port provided in a predetermined position in the front-back direction of the vehicle.

(7) In the door wiring module according to any one of (1) to (6), the guide protruding part may include a downward inclination guide surface directed downward from the outer side surface toward the outer side of the vehicle. Accordingly, water can be guided to the outer side of the vehicle.

A door planar member according to the present disclosure is as follows.

(8) A door planar member incorporated into a door to partition an inner side and an outer side of a vehicle includes an inner side surface directed to the inner side of the vehicle and an outer side surface directed to the outer side of the vehicle, wherein a wiring groove housing at least a part of a wiring member is formed in the inner side surface, a guide protruding part guiding water is formed in the outer side surface, and at least a part of the guide protruding part is formed along at least a part of the wiring groove.

According to the door planar member, the wiring groove is formed, thus a part of the door planar member having a shape of protruding to the outer side of the vehicle can be used as the guide protruding part protruding to the outer side of the vehicle. Accordingly, the door planar member is downsized.

Detailed Description of Embodiment of Present Disclosure

Specific examples of a door wiring module and a door planar member according to the present disclosure are described hereinafter with reference to the drawings. The present disclosure is not limited to these examples, but is indicated by claims, and it is intended that meanings equivalent to claims and all modifications within a scope of claims are included.

Embodiment

Figure 2:
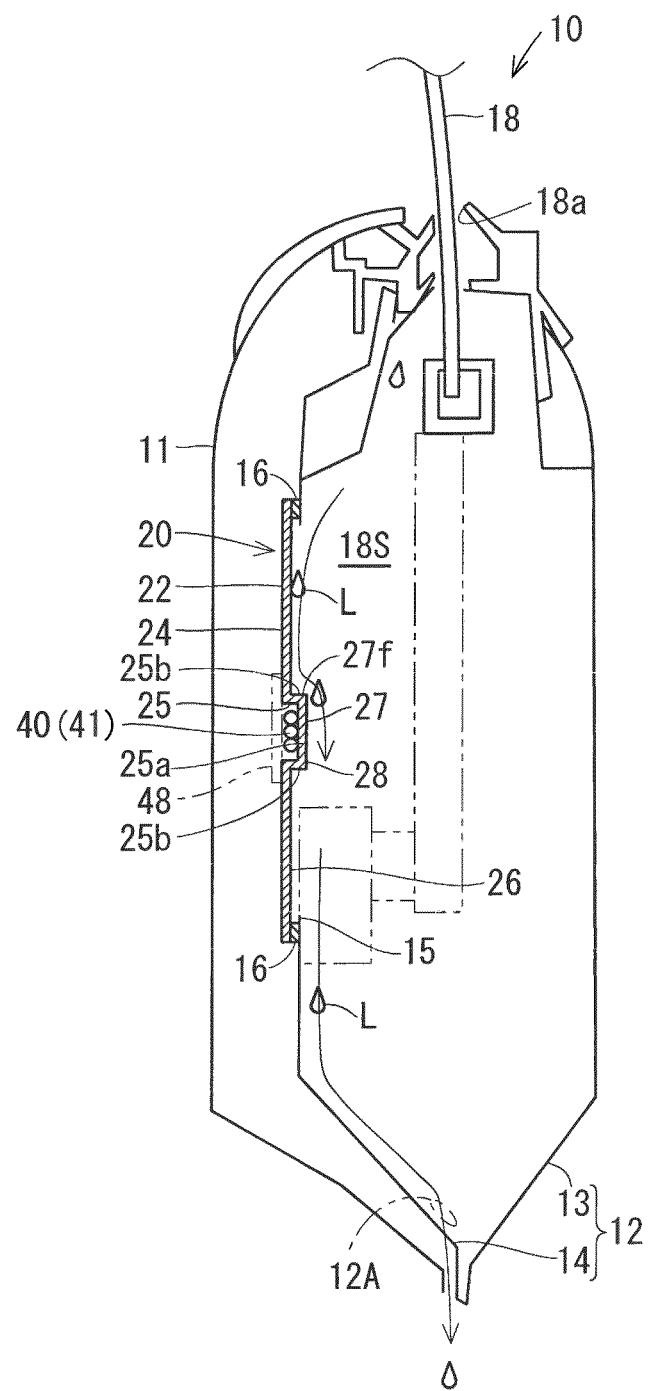
FIG. 2 is a schematic cross-sectional view along a II-II line in FIG. 1.
Figure 3:
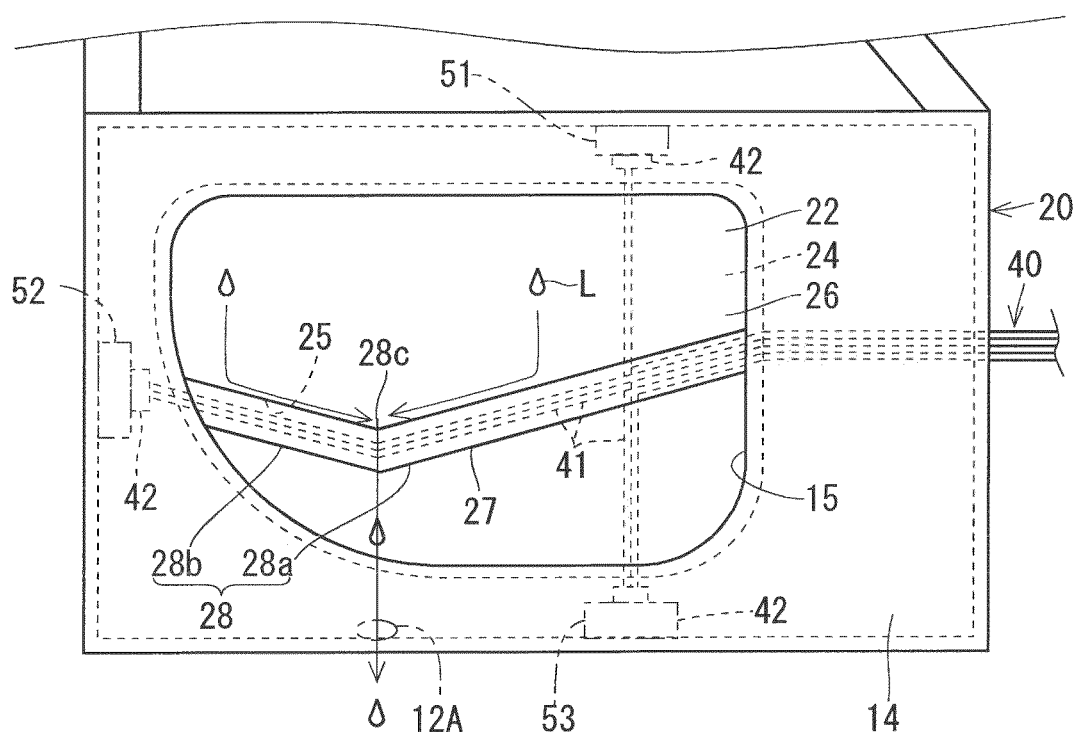
FIG. 3 is a schematic side view illustrating a door into which the door wiring module according to the embodiment is incorporated.

A door wiring module and a door planar member according to an embodiment are described hereinafter. FIG. 1 and FIG. 3 are schematic side views each illustrating a door 10 into which a door wiring module 20 is incorporated. FIG. 1 is the door wiring module 20 seen from an inner side of a vehicle, and FIG. 3 illustrates the door wiring module 20 seen from an outer side of the vehicle. FIG. 2 is a schematic cross-sectional view along a II-II line in FIG. 1.

The door 10 is formed into a flat shape as a whole, and is a part openable and closable to partition the inner side and outer side of the vehicle. The door 10 is assumed to be a driver side door, a passenger's side door, and a rear seat door, for example. The door 10 may be a door opening around a hinge or a sliding door. The door 10 includes a door panel 12 and the door wiring module 20.

The door panel 12 includes an outer panel 13 and an inner panel 14. The outer panel 13 is provided in a part of the door 10 facing the outer side of the vehicle to constitute an appearance of the vehicle together with a body. The inner panel 14 is provided to a vehicle interior side of the outer panel 13. A space 18S for housing a window 18, for example, is generally formed between the outer panel 13 and the inner panel 14. The window 18 exposed to a rainwater environment is housed in the space 18S, and a slit-like opening 18a through which the window 18 goes in and out is formed on an upper side of the space 18S. Thus, the space 18S is a space which water may enter. An opening 15 is provided to the inner panel 14 to access the space 18A described above at a time of manufacturing and maintaining the door 10, for example. The opening 15 is preferably closed at a time of normal use of the vehicle, for example. Thus, the door wiring module 20 is attached to close the opening 15.

The door wiring module 20 includes a door planar member 22 and a wiring member 40. The door planar member 22 is incorporated into the door 10 to close the opening 15 described above. The door planar member 22 can partition the inner side and outer side of the vehicle while the door planar member 22 is incorporated into the door 10. The wiring member 40 is held by the door planar member 22. The door planar member 22 is incorporated into the door 10, thus the wiring member 40 is also incorporated into the door 10.

In the present example, the door planar member 22 is a member incorporated between the door panel 12 and a design trim 11 in the door 10 of the vehicle. The door planar member 22 is not particularly limited as long as it is a member incorporated between the door panel 12 and the design trim 11 in the door 10 of the vehicle, but various planar members can be used. In the description hereinafter, the door planar member 22 is an inner trim.

The door 10 in the present example further includes the design trim 11. The design trim 11 is a part provided in a part of the door 10 facing the inner side of the vehicle to constitute the interior of the vehicle. A door handle and a switch for an in-vehicle apparatus may be attached to the design trim.

The door planar member 22 is formed to be a planar member large enough to be able to close the opening 15 described above. The door planar member 22 is a member in which resin or metal, for example, as a material is molded. The door planar member 22 may be molded by pouring a molten material into a mold or by performing a press molding on a planar material using a mold. The planar member herein indicates a member having a thickness dimension smaller than a dimension in a planar direction (two directions perpendicular to a thickness direction) and two-dimensionally spread. Both surfaces thereof need not necessarily be flat, but a convex-concave portion may occur in both surfaces. The door planar member 22 is formed into a planar shape larger than the opening 15. The door planar member 22 is attached to the inner panel 14 while an outer peripheral part of the door planar member 22 is overlapped with a peripheral part of the opening 15 in the inner panel 14 from a side of a vehicle interior. The door planar member 22 can be fixed to the inner panel 14 by a clip, a screw, or an adhesive agent, for example. A water stop member 16 may be provided between the outer peripheral part of the door planar member 22 and the opening 15. The water stop member 16 may be a rubber or independent foam resin which can intervene between the outer peripheral part of the door planar member 22 and the opening 15, for example.

The door planar member 22 includes an inner side surface 24 and an outer side surface 26. The inner side surface 24 is an inner side surface directed to the inner side of the vehicle. The outer side surface 26 is a surface directed to a side opposite to the inner side surface 24 and directed to the outer side of the vehicle.

A wiring groove 25 is formed in the inner side surface 24. The wiring groove 25 is a groove concaved to the outer side of the vehicle. The wiring groove 25 is formed along at least a part of a route of the wiring member 40 held along the door planar member 22. The wiring member 40 is held along the inner side surface 24 of the door planar member 22 while at least a part of the wiring member 40 is housed in the wiring groove 25. In the present embodiment, the wiring groove 25 is formed from a front part of the inner side surface 24 toward a back part thereof.

A guide protruding part 27 guiding water is formed in the outer side surface 26. The guide protruding part 27 protrudes to the outer side of the vehicle in relation to a major part of the outer side surface 26. Thus, when water streaming down the outer side surface 26 reaches the guide protruding part 27, the water is guided to flow along the guide protruding part 27.

At least a part of the guide protruding part 27 is formed along at least a part of the wiring groove 25. The guide protruding part 27 is formed in a portion where the wiring groove 25 and the guide protruding part 27 are overlapped with each other when seeing from a direction perpendicular to the door planar member 22 using a portion protruding to the outer side of the vehicle by forming the wiring groove 25.

As described above, it is sufficient that at least a part of the guide protruding part 27 is formed along at least a part of the wiring groove 25. Thus, there may be a case where the guide protruding part is not formed on a side of the outer side surface 26 also in a portion where the wiring groove 25 is formed. For example, the wiring groove 25 may be formed at a depth within a range of the thickness of the door planar member 22. The guide protruding part may be formed in the outer side surface 26 in a portion where the wiring groove 25 is not formed.

The wiring member 40 is an electrical wire provided to the door 10 and connected to the electrical components 51, 52, and 53 incorporated into the door 10. For example, the wiring member 40 of the door 10 is connected to an electrical control unit or a power source on a vehicle side at a hinge side of the door 10, and branched on a route from a front side to a back side of the door 10 to be connected to various electrical components 51, 52, and 53. Herein, the wiring member 40 includes a plurality of electrical wires 41. A covering wire having a core wire made up of a conductor with a covering around the core wire can be used as the electrical wires 41. The core wire may be a single core wire or a stranded wire. The electrical components 51, 52, and 53 are assumed to be a motor opening and closing the window, an actuator for locking and unlocking the door 10, and various switches, for example.

The plurality of electrical wires 41 are collected in a parallel state on each one end side. It is assumed that one end portions of the plurality of electrical wires 41 extend from the door 10 from a hinge side thereof in a bundle, and are led to an inner side of a vehicle body, for example. The plurality of electrical wires 41 are disposed to be branched to the electrical components 51, 52, and 53 on a way from a front part to a back part of the door 10. Herein, the electrical component 51 is disposed in an intermediate part in a front-back direction in an upper part of the door panel 12, the electrical component 52 is disposed in an intermediate part in an up-down direction in a back part of the door panel 12, and the electrical component 53 is disposed in an intermediate part in the front-back direction in a lower part of the door panel 12. The plurality of electrical wires 41 follow a main route P1 from an intermediate part to a back side in the up-down direction in the front part of the door 10, and are branched to a route P2 to the electrical component 51 on the upper side, a route P3 to the electrical component 52 to the back side, and a route P4 to the electrical component 53 on the lower side. Some of the electrical wires 41 may not pass through the main route P1. A connector 42 is attached to end portions of the electrical wires 41 along each of the routes P2, P3, and P4. The electrical wires 41 are connected to the electrical components 51, 52, and 53 via the connector 42.

A part of the wiring member 40 located along the back part of the main route P1 and the routes P2, P3, and P4 is held by the door planar member 22. More specifically, a part of the wiring member 40 located along the back part of the main route P1 and the route P3, that is to say, a part thereof directed from a front side to a back side is housed and held in the wiring groove 25. The electrical wires 41 are optionally arranged in the wiring groove 25. For example, the plurality of electrical wires 41 may be disposed in the wiring groove 25 while being arranged in a parallel state. The plurality of electrical wires 41 may be disposed in the wiring groove 25 while being bundled into a circular shape or an oval shape.

A configuration for holding the wiring member 40 in the wiring groove 25 is optionally set. For example, it is applicable that a press member 48 is fixed to both outer sides of the wiring groove 25 in the inner side surface 24 to cover the opening of the wiring groove 25 on the inner side of the vehicle, and the wiring member 40 is pressed in the wiring groove 25 by the press member 48. The press member may be a flexible sheet-like member or a plate-like member which is hardly bended. The press member may cover a part of the wiring groove 25 in a longitudinal direction or the whole wiring groove 25 in the longitudinal direction. The press member 48 can be fixed to the inner side surface 24 by welding such as ultrasonic welding or heat welding, adhesion, or bonding, for example. For example, the wiring member 40 may be fixed to a surface in the wiring groove 25 by welding such as ultrasonic welding or heat welding, adhesion, or bonding. The wiring groove 25 is used, thus the wiring member 40 can be firmly held by the door planar member 22 even when a hole for fixing a clip is not provided to the door planar member 22.

A part of the wiring member 40 along the route P2 is guided upward from the wiring groove 25. A part of the wiring member 40 along the route P4 is guided downward from the wiring groove 25. A part of the wiring member 40 along the routes P2 and P4 may be or may not be held on the outer side surface 26. For example, a part of the wiring member 40 along the routes P2 and P4 may be fixed to the outer side surface 26 by welding such as ultrasonic welding or heat welding, adhesion, or bonding. For example, it is applicable that the wiring groove is also formed in a part of the door planar member 22 along the routes P2 and P4 and the wiring member is held in the wiring groove.

When the present door wiring module 20 is attached to the inner panel 14 to cover the opening 15 in the inner panel 14, the wiring member 40 is held on the door panel 12. In this state, the connector 42 is connector-connected to the corresponding electrical components 51, 52, and 53. The opening 15 is covered by the door planar member 22, and ingress of water from the space 18S to the inner side of the vehicle is suppressed.

The wiring groove 25 and the guide protruding part 27 are described more specifically.

The wiring groove 25 is a groove surrounded by a bottom part 25a and a pair of lateral parts 25b. The bottom part 25a is an elongated part formed along a back part of the main route P1 and the route P3 when seen from the direction perpendicular to the door planar member 22. The pair of lateral parts 25b upstands from both side parts of the bottom part 25a in the direction intersecting with the door planar member 22, and are connected to a part extending to a major part of the door planar member 22. The wiring groove 25 opened to the inner side of the vehicle is formed by a surface of the bottom part 15a directed to the inner side of the vehicle and two surfaces of the pair of lateral parts 25b facing each other. The wiring groove 25 and the guide protruding part 27 may be or may not be formed on the outer peripheral part of the door planar member 22. In this case, the wiring groove 25 and the guide protruding part 27 may be gradually shallower or lower toward the outer peripheral part. The wiring groove 25 and the guide protruding part 27 may also be flat in the outer peripheral part via a level difference. When the wiring groove 25 and the guide protruding part 27 are not formed in the outer peripheral part of the door planar member 22, a part of the outer peripheral part of the door planar member 22 facing the inner panel 14 can be easily formed to have a planar surface. Accordingly, a gap hardly occurs between the outer peripheral part of the door planar member 22 and the inner panel 14.

At least a part of the bottom part 25a and the pair of lateral parts 25b protrudes from the outer side surface 26 to form at least a part of the guide protruding part 27. Herein, the pair of lateral parts 25b and the bottom part 25a connecting the pair of lateral parts 25b protrude to the outer side of the vehicle from the outer side surface 26, and the protruding part thereof forms the guide protruding part 27. Thus, the guide protruding part 27 is formed along the wiring groove 25 in the present embodiment.

The route of the guide protruding part 27 and the route of the wiring groove 25 need not coincide with each other. For example, the route of the guide protruding part 27 can be set to be different from the route of the wiring groove 25 by changing the thickness of the lateral part. For example, the routes thereof can be set to be different from each other by gradually increasing the thickness of the lateral part from the front side to the back side of the wiring groove 25 along the horizontal direction.

The guide protruding part 27 described above includes an inclined part 28 inclined relative to the front-back direction of the vehicle. The inclined part 28 is a part observed to be inclined when seen along the vehicle width direction. The inclined part 28 may be a linear inclination, a curved inclination, or a combination thereof. In the curved inclination, it can be evaluated whether or not the part is inclined by a tangent line. The guide protruding part 27 is a protruding part for guiding water, thus an extension direction of the guide protruding part 27 can be grasped based on an upward part thereof in a gravity direction. An upward surface of the guide protruding part 27 may coincide with the horizontal direction of the vehicle width, or may also be inclined with respect thereto. Described in the present embodiment is an example that the whole upward surface of the guide protruding part 27 is a horizontal guide surface 27f horizontally extending in the vehicle width direction.

The whole guide protruding part 27 is the inclined part 28 in the present embodiment. The whole guide protruding part is not necessarily the inclined part 28, however, a part of the guide protruding part may extend along the horizontal direction of the front-back side of the vehicle. The guide protruding part does not necessarily have the inclined part, however, the whole guide protruding part may extend along the horizontal direction of the front-back side of the vehicle.

The inclined part 28 is inclined to guide water to one position in the front-back direction of the vehicle. The inclined part 28 includes a first inclined part 28a and a second inclined part 28b in the present embodiment. The first inclined part 28a is located close to the front part of the vehicle, and the second inclined part 28b is located closer to the back side of the vehicle in relation to the first inclined part 28a. The first inclined part 28a is formed into a shape directed downward toward the back side. The second inclined part 28b is formed into a shape directed upward toward the back side.

Thus, water L flowing in the first inclined part 28a in the outer side surface 26 of the door planar member 22 is directed to the back side in accordance with the inclination of the first inclined part 28a. The water L flowing in the second inclined part 28b in the outer side surface 26 of the door planar member 22 is directed to the front side in accordance with the inclination of the second inclined part 28b. Thus, the water flowing in the inclined part 28 is guided to one position as a confluence position 28c of the first inclined part 28a and the second inclined part 28b. The water L flows along the outer surface of the bottom part 25a from the upward surface of the lateral part 25b in the confluence position 28c, and drops down at a lower edge of the outer surface of the bottom part 25a. The dropping water is discharged to the outer part through a lower space between the inner panel 14 and the outer panel 13. For example, a discharge port 12A is formed in the lower part of the door panel 12. The confluence position 28c is located on an upper side of the discharge port 12A described above in the front-back direction of the vehicle. Accordingly, the water dropping down at the confluence position 28c reaches near the discharge port 12A, and can be smoothly discharged outside the door 10 from the discharge port 12A.

According to the door planar member 22 or the door wiring module 20 having such a configuration, at least a part of the guide protruding part 27 is formed along at least a part of the wiring groove 25. The wiring groove 25 is formed, thus a part of the door planar member 22 having a shape of protruding to the outer side of the vehicle is used as the guide protruding part 27. The guide protruding part 27 can have a role of guiding the water flowing along the outer side surface of the door planar member 22 in a different direction, for example, along the outer side in the vehicle width direction or the front-back direction of the vehicle or guiding the water to a position appropriate for water discharge. The water guided along the outer side in the vehicle width direction or the front-back direction of the vehicle hardly reaches a joint part of the peripheral part of the opening 15 in the inner panel 14 and the door planar member 22, for example, thus hardly enters the inner side of the inner panel 14. Accordingly, the door planar member 22 is downsized while the wiring groove 25 housing the wiring member 40 and the guide protruding part for guiding the water are formed in the door planar member 22.

If the wiring groove and the guide protruding part are separately formed in the door planar member, the whole door planar member or a part thereof is formed to be thick to form the guide protruding part on the outer side surface of the door planar member and ensure the depth of the wiring groove. Thus, door planar member is upsized. As described above, the guide protruding part is formed using a portion where the outer side surface of the door planar member 22 protrudes due to the formation of the wiring groove 25, thus the door planar member 22 and the door wiring module 20 are downsized.

Specifically, the guide protruding part 27 is formed using at least a part of the bottom part 25a and the pair of lateral parts 25b for forming the wiring groove 25, thus the door wiring module 20 is downsized. Reduction of a resin amount, simplification of the shape, and cost reduction are achieved.

The guide protruding part 27 includes the first inclined part 28a and the second inclined part 28b inclined relative to the front-back direction of the vehicle. Thus, the water is guided to the front-back direction of the vehicle. Accordingly, the water can be guided to the position appropriate for water discharge in a case where a position inappropriate for water wetting and a position appropriate for water discharge are located in different positions in the front-back direction of the vehicle.

The first inclined part 28a and the second inclined part 28b described above are inclined to guide the water to one position in the front-back direction of the vehicle. Accordingly, the water can be easily discharged at one position. Herein, the first inclined part 28a and the second inclined part 28b are inclined to guide the water to the upper side of the discharge port 12A. Accordingly, the water does not remain in the first inclined part 28a and the second inclined part 28b, but is smoothly guided to a position appropriate for water discharge, for example.

The guide protruding part 27 includes the horizontal guide surface 27f along the horizontal direction in the vehicle width direction. Accordingly, the door planar member 22 can be easily processed by a mold. For example, the thickness of the lateral part for forming the wiring groove 25 can be easily unified, thus the guide protruding part 27 can be easily formed also from this viewpoint. Thus, the guide protruding part 27 can be easily formed.

Embodiment

Figure 4:
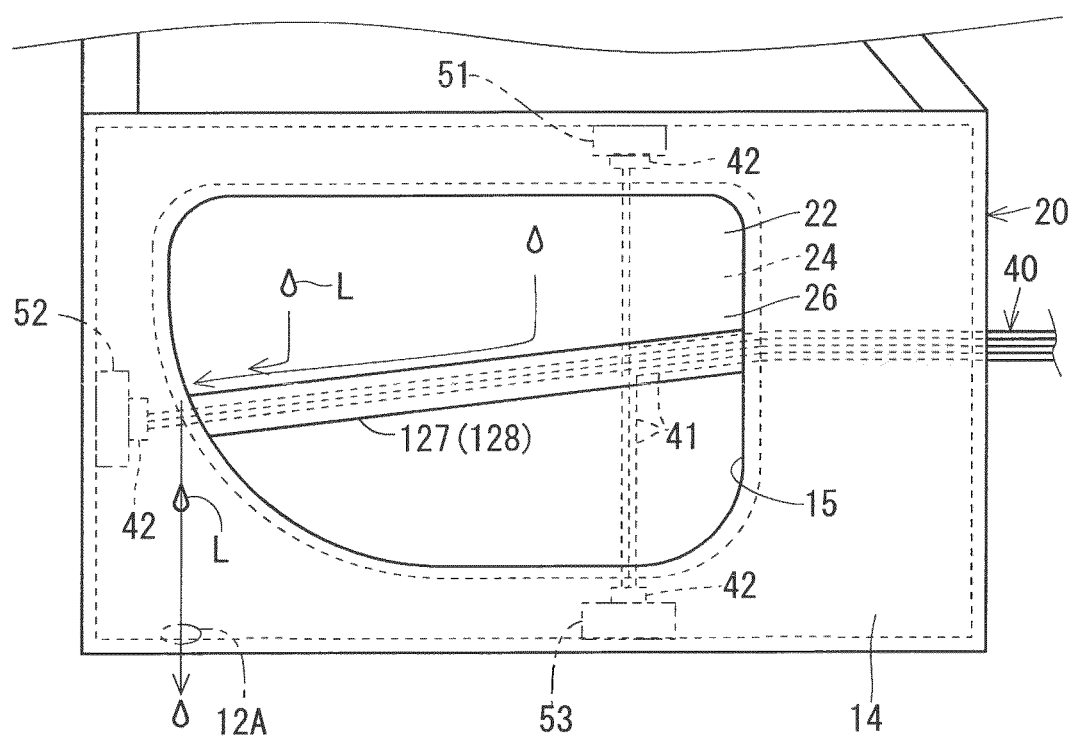
FIG. 4 is a side view illustrating a guide protruding part according to a first modification example.

FIG. 4 is a side view illustrating a guide protruding part 127 according to a first modification example. In the first modification example, the guide protruding part 127 corresponding to the guide protruding part 27 includes an inclined part 128. The whole guide protruding part 127 is the inclined part 128 in the present modification example. The inclined part 128 is inclined to be directed to a lower side toward the back side in the front-back direction of the vehicle. Thus, the inclined part 128 can guide the water toward one position in a back end of the guide protruding part 127. In this case, the discharge port 12A may be formed in the lower part of the door panel 12 on a lower side of a back end portion of the guide protruding part 127. Accordingly, the water can be guided to the back side along the inclined part 128, and can be discharged via the discharge port 12A. The inclined part may be inclined to be directed to the lower side toward the front side in the front-back direction of the vehicle.

Figure 5:
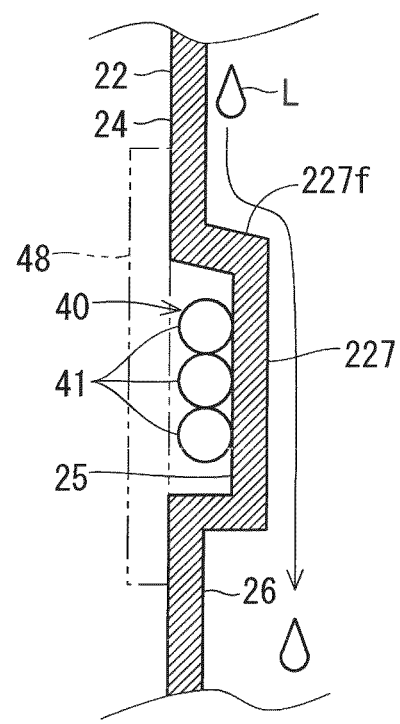
FIG. 5 is a cross-sectional view illustrating a guide protruding part according to a second modification example.

FIG. 5 is a cross-sectional view illustrating a guide protruding part 227 according to a second modification example. In the second modification example, the guide protruding part 227 corresponding to the guide protruding part 27 includes a downward inclination guide surface 227f directed downward from the outer side surface 26 toward the outer side of the vehicle. The downward inclination guide surface 227f may be wholly or partially formed in the longitudinal direction of the guide protruding part 227. The downward inclination guide surface 227f may be a planar surface, a curved surface, or a combination thereof. When the downward inclination guide surface 227f includes the curved surface, presence or absence of the inclination described above can be determined by a tangent plane thereof.

According to the present second modification example, the water reaching the downward inclination guide surface 227f is guided to the outer side in the vehicle width direction in accordance with the inclination of the downward inclination guide surface 227f. Thus, the water is easily separated from the door planar member 22 and drops down. Accordingly, the water hardly reaches the joint part of the peripheral part of the opening 15 in the inner panel 14 and the door planar member 22 on the lower side of the guide protruding part 227, for example.

Figure 6:
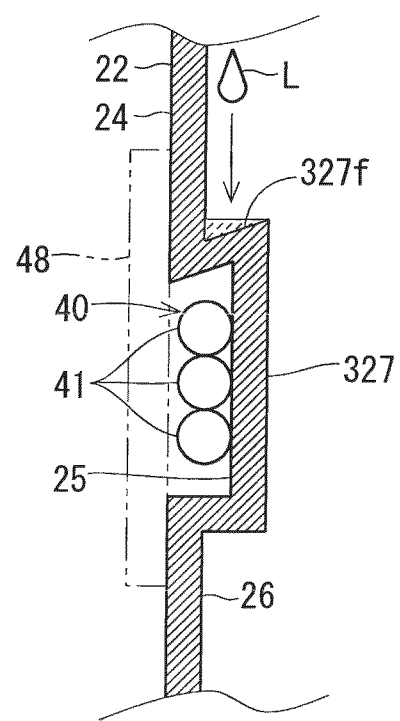
FIG. 6 is a cross-sectional view illustrating a guide protruding part according to a third modification example.

FIG. 6 is a cross-sectional view illustrating a guide protruding part 327 according to a third modification example. In the third modification example, the guide protruding part 327 corresponding to the guide protruding part 27 includes a downward inclination guide surface 327f directed upward from the outer side surface 26 toward the outer side of the vehicle. The upward inclination guide surface 327f may be wholly or partially formed in the longitudinal direction of the guide protruding part 327. In the manner similar to the downward inclination guide surface 227f described above, the upward inclination guide surface 327f may be a planar surface, a curved surface, or a combination thereof.

According to the present third modification example, the water reaching the upward inclination guide surface 327f is easily guided to a base end side of the upward inclination guide surface 327f to flow on the upward inclination guide surface 327f along the guide protruding part 327. Accordingly, the water does not drop down on the outer side of the vehicle but is easily guided to the front side or the back side of the vehicle. Accordingly, the water can be easily guided toward the discharge port 12A provided in a predetermined position in the front-back direction of the vehicle.

Plural surfaces selected from the horizontal guide surface 27f, the downward inclination guide surface 227f, and the upward inclination guide surface 327f described above may be combined with each other. For example, it is applicable that the guide protruding part includes the downward inclination guide surface 227f in an upper position of the discharge port 12A and includes the horizontal guide surface 27f or the upward inclination guide surface 327f in the other position.

Each configuration described in the embodiments and modification examples thereof can be appropriately combined as long as they are not contradictory.

EXPLANATION OF REFERENCE SIGNS 10 door
11 design trim
12 door panel
12A discharge port
13 outer panel
14 inner panel
15 opening
16 water stop member
18 window
18S space
18a opening 20 door wiring module
22 door planar member
24 inner side surface
25 wiring groove
25a bottom part
25b lateral part
26 outer side surface
27, 127, 227, 327 guide protruding part
27f horizontal guide surface
28, 128 inclined part
28a first inclined part
28b second inclined part
28c confluence position
40 wiring member
41 electrical wire
42 connector
48 press member
51, 52, 53 electrical component
22f downward inclination guide surface
327f upward inclination guide surface
L water
P1 main route
P2, P3, P4 route

The invention claimed is:

1. A door wiring module, comprising:
a door planar member incorporated into a door to partition an inner side and an outer side of a vehicle; and
a wiring member held by the door planar member, wherein
the door planar member includes an inner side surface directed to the inner side of the vehicle and an outer side surface directed to the outer side of the vehicle,
a wiring groove is formed in the inner side surface,
at least a part of the wiring member is housed in the wiring groove,
a guide protruding part, which guides water, is formed in the outer side surface,
at least a part of the guide protruding part is formed along at least a part of the wiring groove,
the wiring groove is a groove surrounded by a bottom part and a pair of lateral parts upstanding from two facing longitudinal edges of the bottom part,
at least a part of the pair of lateral parts and/or a part of the bottom part protrudes from the outer side surface to form at least the part of the guide protruding part,
the guide protruding part includes a first inclined part and a second inclined part, the first inclined part inclines downward toward a back side of the vehicle,
the second inclined part inclines upward toward the back side of the vehicle,
a back end of the first inclined part and a front end of the second inclined part meet at a confluence position such that water is guided to the confluence position, and
the door wiring module further includes a discharge port provided below the confluence position to discharge water outside the door from the discharge port.

2. The door wiring module according to claim 1, wherein the guide protruding part includes a horizontal guide surface along a horizontal direction in a vehicle width direction.

3. The door wiring module according to claim 1, wherein the guide protruding part includes an upward inclination guide surface directed upward from the outer side surface toward the outer side of the vehicle.

4. The door wiring module according to claim 1, wherein the guide protruding part includes a downward inclination guide surface directed downward from the outer side surface toward the outer side of the vehicle.

5. The door wiring module according to claim 1, wherein the guide protruding part includes an upward inclination guide surface provided at an upper portion of the guide protruding part and above the wiring groove, and
the upward inclination guide is directed upward from the outer side surface toward the outer side of the vehicle.

6. The door wiring module according to claim 1, wherein the wiring groove is gradually shallower toward an outer peripheral part of the door planar member.

7. The door wiring module according to claim 1, wherein the wiring groove extends along a horizontal direction, and
a thickness of a lateral part of the pair of lateral parts in a vertical direction increases from a front side to the back side of the vehicle.

8. A door planar member incorporated into a door to partition an inner side and an outer side of a vehicle, comprising:
an inner side surface directed to the inner side of the vehicle and an outer side surface directed to the outer side of the vehicle, wherein
a wiring groove configured to house at least a part of a wiring member is formed in the inner side surface,
a guide protruding part, which guides water is formed in the outer side surface,
at least a part of the guide protruding part is formed along at least a part of the wiring groove,
the wiring groove is a groove surrounded by a bottom part and a pair of lateral parts upstanding from two facing longitudinal edges of the bottom part,
at least a part of the pair of lateral parts and/or a part of the bottom part protrudes from the outer side surface to form at least the part of the guide protruding part,
the wiring groove extends along a horizontal direction, and
a thickness of a lateral part of the pair of lateral parts in a vertical direction increases from a front side to the back side of the vehicle.

9. A door wiring module, comprising:
a door planar member incorporated into a door to partition an inner side and an outer side of a vehicle; and
a wiring member held by the door planar member, wherein
the door planar member includes an inner side surface directed to the inner side of the vehicle and an outer side surface directed to the outer side of the vehicle,
a wiring groove is formed in the inner side surface,
at least a part of the wiring member is housed in the wiring groove,
a guide protruding part, which guides water, is formed in the outer side surface,
at least a part of the guide protruding part is formed along at least a part of the wiring groove,
the wiring groove is a groove surrounded by a bottom part and a pair of lateral parts upstanding from two facing longitudinal edges of the bottom part,
at least a part of the pair of lateral parts and/or a part of the bottom part protrudes from the outer side surface to form at least the part of the guide protruding part,
the guide protruding part includes an upward inclination guide surface provided at an upper portion of the guide protruding part and above the wiring groove, and the upward inclination guide is directed upward from the outer side surface toward the outer side of the vehicle.

\* \* \* \* \*